(12) United States Patent
Proett et al.

(10) Patent No.: US 7,444,242 B2
(45) Date of Patent: Oct. 28, 2008

(54) METHOD AND SYSTEM FOR STATISTICAL PRESSURE GRADIENT AND FLUID CONTACT ANALYSIS

(75) Inventors: Mark A. Proett, Missouri City, TX (US); Bruce H. Storm, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 162 days.

(21) Appl. No.: 11/453,153

(22) Filed: Jun. 13, 2006

(65) Prior Publication Data

US 2006/0282219 A1 Dec. 14, 2006

Related U.S. Application Data

(60) Provisional application No. 60/689,995, filed on Jun. 13, 2005.

(51) Int. Cl.
*G01V 1/40* (2006.01)
(52) U.S. Cl. .................................. 702/11; 702/138
(58) Field of Classification Search .................. 702/11, 702/12, 13, 138
See application file for complete search history.

(56) References Cited

U.S. PATENT DOCUMENTS

| | | | | |
|---|---|---|---|---|
| 5,128,866 | A * | 7/1992 | Weakley | 702/11 |
| 7,044,237 | B2 * | 5/2006 | Leuchtenberg | 175/48 |

OTHER PUBLICATIONS

Kabir, C.S., et al.; "How Reliable is Fluid Gradient in Gas/Condensate Reservoirs?;" Gas Technology Symposium; May 14-17, 2006; pp. 1-15; SPE 99386; Society of Petroleum Engineers; Calgary, Alberta, Canada.

Stewart, G., et al.; "The Interpretation of Vertical Pressure Gradients Measured at Observation Wells in Developed Reservoirs;" 57th Annual Fall Technical Conference and Exhibition of the Society of Petroleum Engineers of AIME; Sep. 26-29, 1982; pp. 1-12; SPE 11132; Society of Petroleum Engineers; New Orleans, Louisiana, USA.

Kapuria, R.; "Pressure Gradient Interpretation;" Halliburton Formation Testing Training Class; Jan. 2004; USA.

* cited by examiner

*Primary Examiner*—John E. Barlow, Jr.
*Assistant Examiner*—Stephen J Cherry
(74) *Attorney, Agent, or Firm*—Conley Rose, P.C.

(57) ABSTRACT

A method and system for statistical pressure gradient and fluid contact analysis. The method and system include planning for a pressure gradient test by using expected parameters and statistical expected error analysis to set the actual pressure gradient test parameters within an acceptable range of reliability. The method and system may account for one or more fluids within a formation and may also perform fluid contact analysis as part of planning the overall pressure gradient test. The method and system also include performing the planned pressure gradient test and comparing the measured data and statistical measured data error analysis with statistical expected error analysis of the measured data. The method and system may also include the graphical display of both the expected and measured data to optimize the pressure gradient analysis and the pressure gradient test procedure.

25 Claims, 6 Drawing Sheets

METHOD AND SYSTEM FOR STATISTICAL PRESSURE GRADIENT AND FLUID CONTACT ANALYSIS

CROSS-REFERENCE TO RELATED APPLICATIONS

This application claims the benefit under 35 U.S.C. 119(e) of U.S Provisional Application No. 60/689,995, entitled "Method and System for Statistical Pressure Gradient and Fluid Contact Analysis", filed Jun. 13, 2005.

STATEMENT REGARDING FEDERALLY SPONSORED RESEARCH OR DEVELOPMENT

Not Applicable.

BACKGROUND

Formation testers are used at various times in drilling and/or producing a well to create gradient plots where recorded formation pressures are plotted against formation depth and used to determine in situ fluid densities. This information may then be used to identify the type of fluid in the formation, such as oil, gas, and/or water. Additionally, more than one type of fluid, i.e., oil, water, and/or gas, may be located within a particular zone of interest. When there are two or more fluids present in a continuous zone and two fluid gradients can be identified then the intersection of these gradients is assumed to be the fluid contact. If one of the fluids in a formation is determined to be water, the operator may decide to perforate the well above the water level. Therefore, the depth of the changes from one fluid to another, or fluid contacts, within a formation zone are analyzed to determine the overall design of the well or estimating reserves of producible hydrocarbons within an already producing formation. The pressure gradient plots may also be used to determine whether zones within a formation are fluidly connected.

Developing a gradient plot for analysis involves operating a formation tester within a well bore to measure formation pressures at various planned locations at different depths. Choosing how many locations and at what depths to perform the pressure tests may affect the overall results of the gradient analysis and the acceptable reliability of the analysis. Theoretically, the more pressure tests performed allows more data points to be measured, resulting in a more accurate gradient plot. However, more pressure tests take more time and thus may raise the overall expenses of drilling a well. Additional reliability variables include the accuracy of the measurement instruments and the methods of data analysis once obtained The properties of a single type of fluid may also change at different depths within the same formation due to biodegradation or other causes The reliability of the analysis and the economics of obtaining the measurement data are balanced in generating a pressure gradient.

BRIEF DESCRIPTION OF THE DRAWINGS

For a more detailed description of the embodiments, reference will now be made to the following accompanying drawings.

DETAILED DESCRIPTION OF THE EMBODIMENTS

Figure 1:
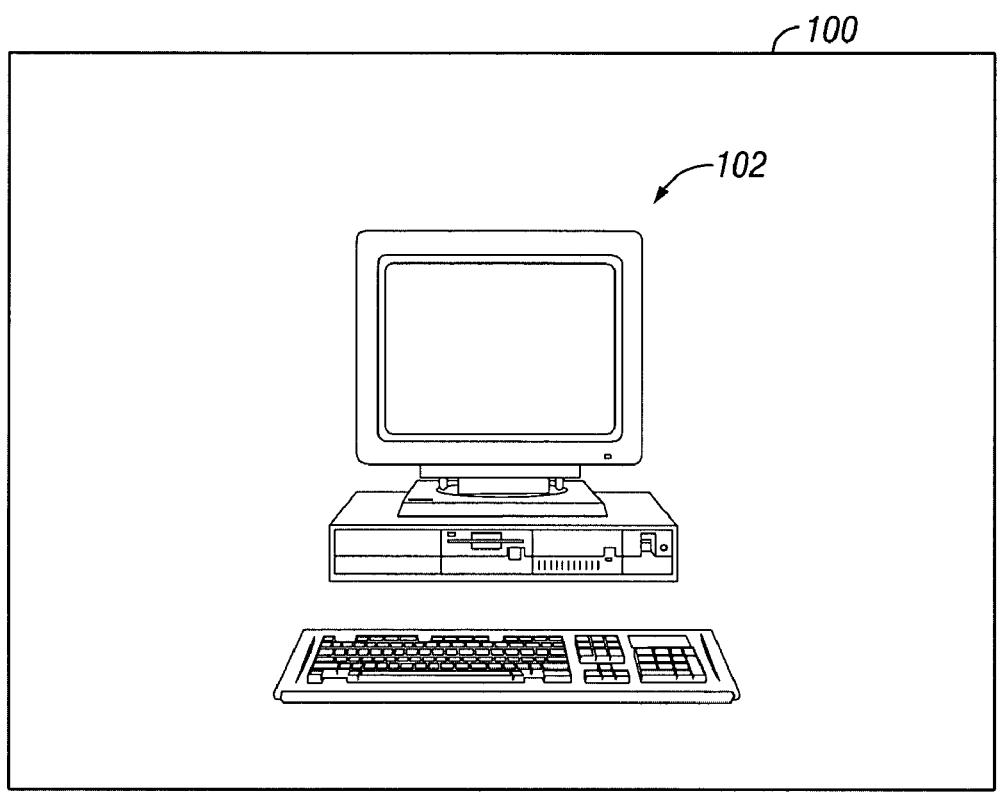
FIG. 1 illustrates a system for statistical pressure gradient and fluid contact analysis.

In the drawings and description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results Any use of any form of the terms "connect", "engage", "couple", "attach", or any other term describing an interaction between elements is not meant to limit the interaction to direct interaction between the elements and may also include indirect interaction between the elements described, Additionally, the term "system" refers to a collection of two or more parts and may be used to refer to a computer system or a portion of a computer system. Further the term "software" includes any executable code capable of running on a processor, regardless of the media used to store the software. Thus, code stored in non-volatile memory, and sometimes refined to as "embedded firmware," is included within the definition of software. The various characteristics mentioned above, as well as other features and characteristics described in more detail below, will be readily apparent to those skilled in the art upon reading the following detailed description of the embodiments, and by referring to the accompanying drawings.

FIG. 1 illustrates a system 100 in accordance with one or more embodiments for statistical pressure gradient and fluid contact analysis. The system 100 may include a computer 102 configured to perform the function of planning a pressure gradient pressure test to determine a pressure gradient and a fluid contact. The computer 102 may also be used to perform the comparison of a planned pressure gradient test and the results of a measured pressure gradient test. The computer 102 may be any commercially available server system and may be configured to execute any commercially available operating system including versions of Windows®, HP-UX, Solaris, and Linux. Windows is a registered trademark of Microsoft Corporation. While a single computer 102 is illustrated for simplicity of explanation, the system may include multiple computers 102, and the functionality of the system be distributed and load balanced across these computers.

Figure 2:
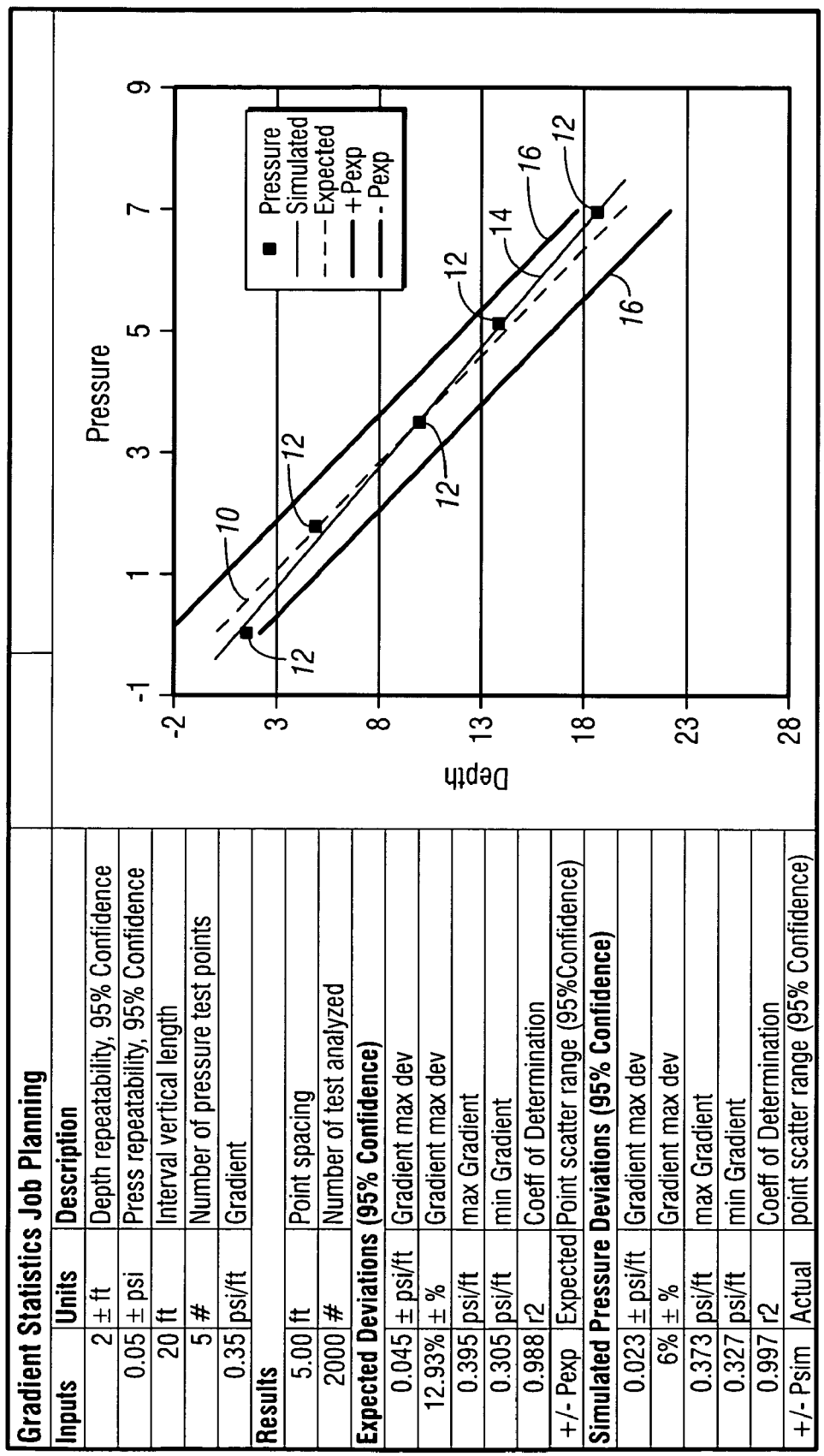
FIG. 2 illustrates results from a statistical analysis of expected pressure gradient accuracies for a particular scenario of pressure sampling assuming equally spaced depth points.

The system 100 is used to perform a method of planning a pressure gradient test using statistical analysis. Planning the pressure gradient test includes predicting an expected pressure gradient for a fluid in a formation. The expected pressure gradient may also be a range of pressure gradients. A depth repeatability and a pressure test repeatability is assumed for a selected statistical analysis confidence level. The depth repeatability and pressure repeatability are estimates of the precision of the measurement. Precision can be determined by repeating a pressure or depth measurement a number of times and determining the mean and variance. The variance can be expressed as a standard deviation σ and then by assuming an appropriate distribution a confidence limit for the measurement can be determined. In many cases a normal or Gaussian distribution is assumed with the standard deviation C having a confidence limit of 68% and two standard deviations 2σ having a confidence limit of 96%. It is customary to use a 95% confidence limit which is 1.96 standard deviations or 1.96σ. With a 95% confidence limit it is expected that 19 out of 20 measurements Will fall within ±1.96σ. Other types of distributions can be assumed such as Gaussian, Poisson, Binomial, and others, An expected pressure gradient error analysis is then performed with the results tabulated and/or graphically displayed as illustrated in FIG. 2. The analysis involves determining the expected error for the pressure gradient using statistical analysis of the expected pressure gradient, the depth repeatability, and the pressure test repeatability Other inputs for the error analysis include the depth interval to be tested and the number of test points taken at equal spacing over the interval The statistical analysis used may be selected by the user and may include, for example, a stochastic statistical analysis assuming normal distribution. One type of stochastic analysis that may be used is a Monte Carlo simulation From the statistical analysis, upper and lower boundaries reflecting the calculated deviation of the expected pressure gradient error are determined. The error boundaries depend in part on the selected confidence limits for the depth repeatability and the pressure test repeatability. The boundaries may also be displayed as lines 16 The expected gradient may also be displayed as line 10A The expected pressure gradient error analysis involves a set of simulated pressure test data points 12 used for the statistical analysis A simulated pressure gradient 14 is also determined based on the simulated pressure test data points 12. The analysis may further include displaying the set of simulated pressure test data points 12 and simulated pressure gradient 14 on the confidence level boundary plot as shown in FIG. 2. These simulated points 12 are based on the number of test points chosen to be distributed equally over the depth interval. Using the results from the expected pressure gradient error analysis as well as the graphical results of the confidence level boundary plot, the user may then set the pressure gradient test parameters for the pressure gradient test.

One aspect of planning a pressure gradient test includes the analysis of the level of accepted reliability of the results of the planned pressure gradient test. Should the user decide the results of the expected pressure gradient error analysis are not satisfactory, e.g., not reliable enough, the system 100 allows the user to perform multiple iterations altering various parameters of the simulation. For example, a different confidence level may be selected. Alternatively, the user can vary the number of test points or the depth interval to determine how the test plan can impact the gradient accuracy The expected pressure gradient error analysis is then performed again using the different confidence levels, or changed number of test points, or changed depth interval, or a combination of any of the inputs to generate new boundary lines 16 as well as a new set of simulated data points 12 and simulated gradient 14. The results from the analysis using the different inputs may then be used to set the actual pressure gradient test parameters or new inputs may be selected and the process repeated.

As another example, the user may alter either the expected pressure gradient, the depth repeatability, or the pressure test repeatability, or any combination of these parameters. The expected pressure gradient error analysis is then performed again using the different parameters to generate new boundary lines 16 as well as a new set of simulated data points 12 and simulated gradient 14. The results from the analysis using the different parameters may then be used to set the actual pressure gradient test parameters or new parameters may be selected and the process repeated.

Figure 3:
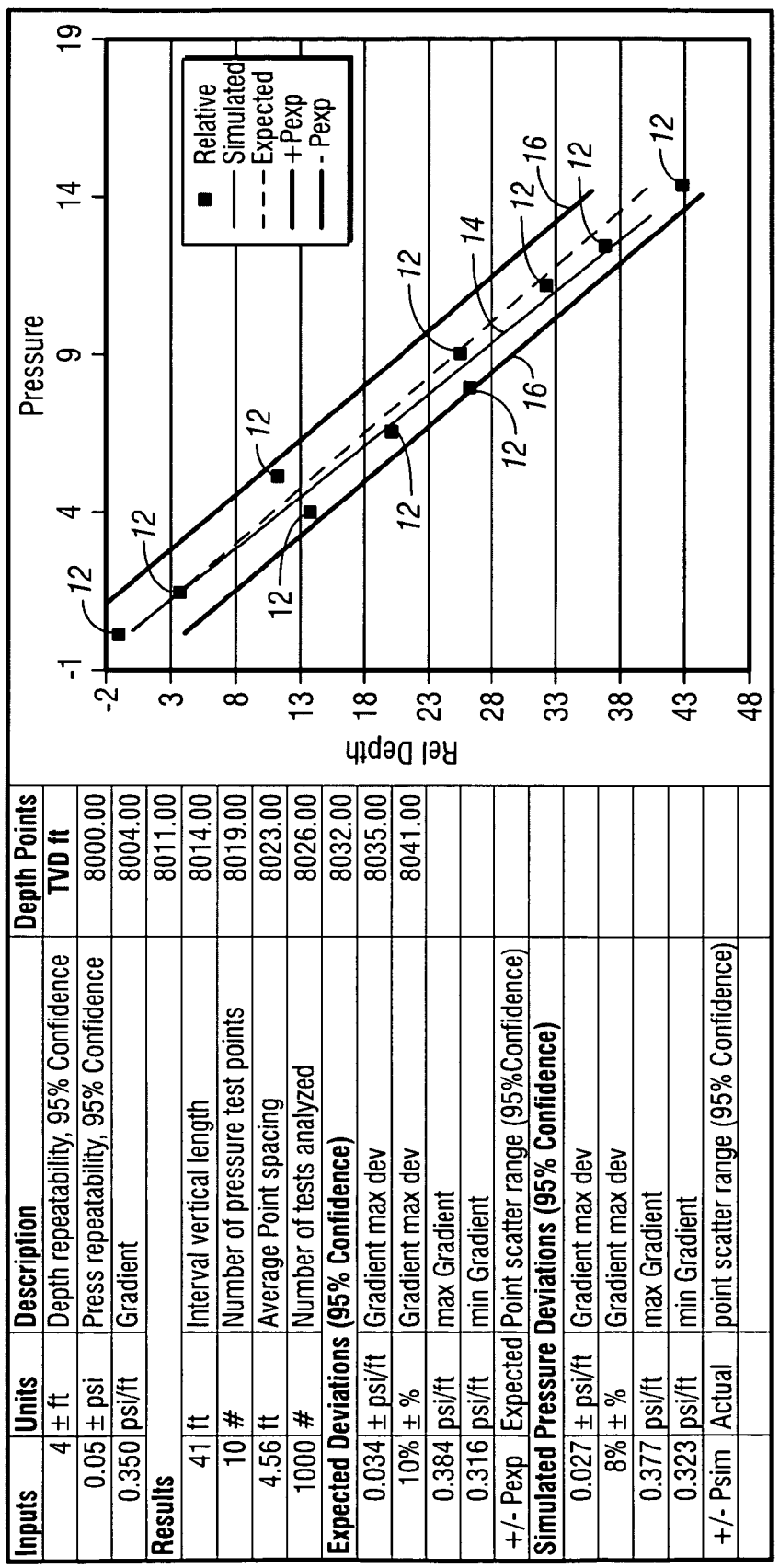
FIG. 3 illustrates results from a statistical analysis of expected pressure gradient accuracies for a particular scenario of pressure sampling with non-equally spaced depth points.

As another example, the user may generate a second set of simulated pressure test data points by removing or adding pressure test data points from the set of simulated data test points. The user may select which data points 12 to remove as well as which data points 12 to add. The data points 12 may be evenly spaced apart as illustrated in FIG. 2 or may be unevenly spaced apart as illustrated in FIG. 3. The data points 12 may also be regenerated completely using a new set of data points 12 from the statistical analysis The new data points 12 are then displayed on the confidence level boundary plot along with any corresponding change in the confidence level boundary lines 16

Figure 6:
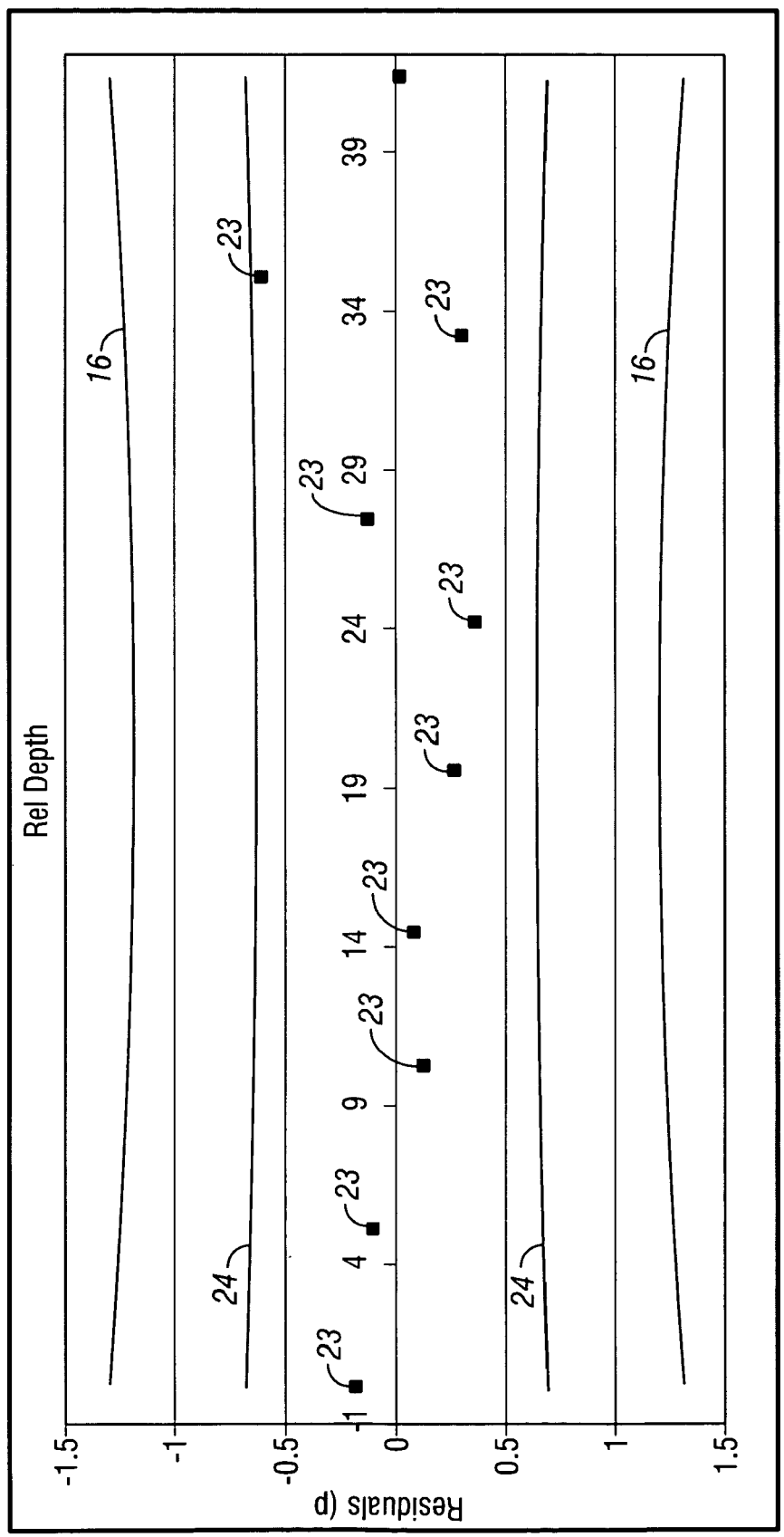
FIG. 6 illustrates a residual diagnostic plot with actual and expected boundaries.

Alternatively to the confidence level boundary plot as illustrated in FIG. 2, a residual plot may be generated as illustrated in FIG. 6 where either the pressure or depth deviations from an expected gradient are plotted normally against depth.

Figure 4:
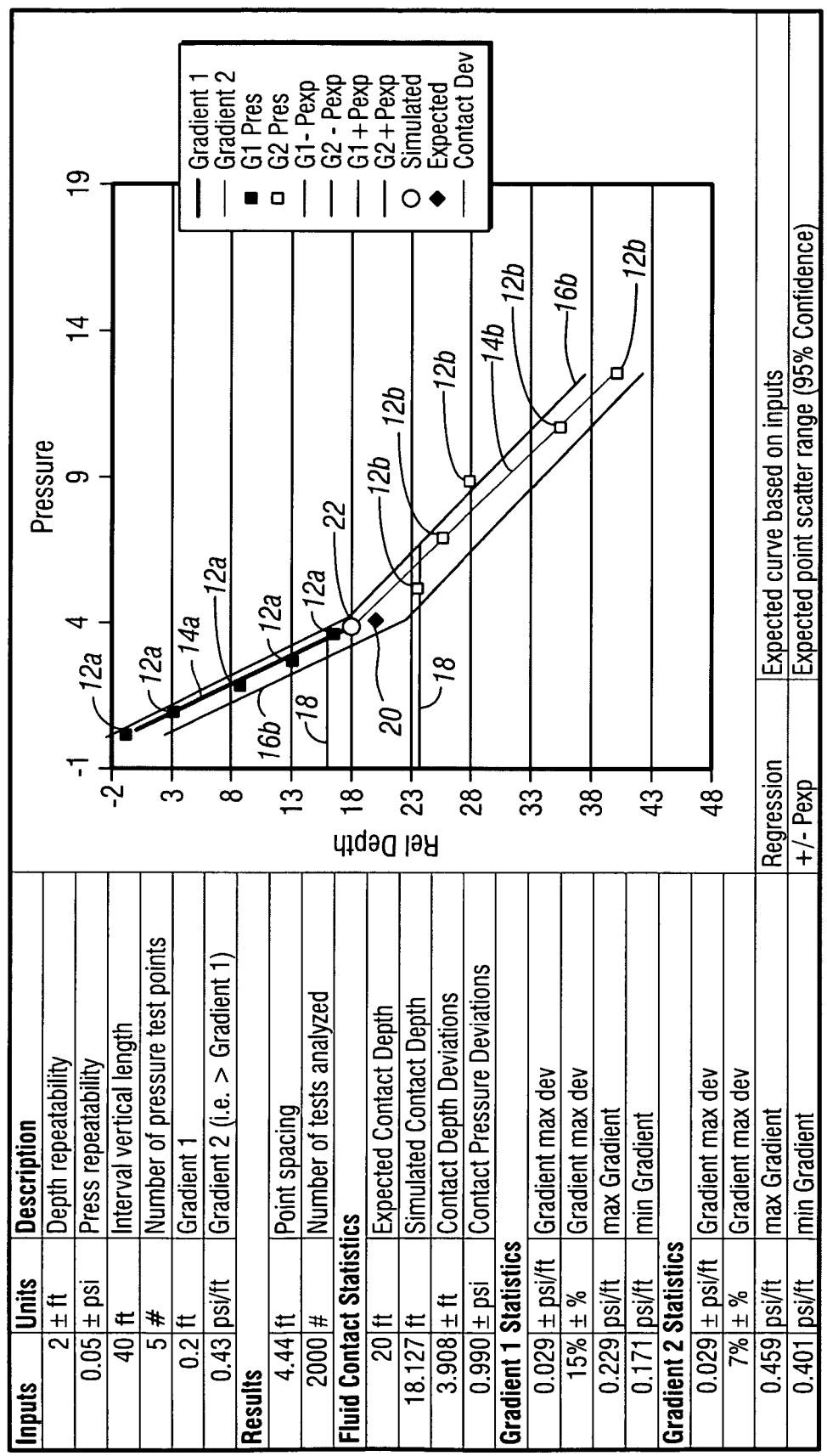
FIG. 4 illustrates results from a statistical analysis of expected fluid contact accuracies for a particular scenario of pressure sampling.

As illustrated in FIG. 4, the planning of the pressure gradient test may also take into account more than one fluid in the formation. In this scenario, the expected pressure gradient is predicted for each fluid in the formation to be analyzed. Additionally, the user selects a depth repeatability and a pressure test repeatability for a selected confidence level for each of the fluids. The user also selects the depth interval and the number of pressure tests to be used for each of the gradients The expected pressure gradient error analysis is then performed for each of the fluids. The results may then be displayed as shown in FIG. 4.

As also illustrated in FIG. 4, with more than one fluid in the formation, the expected fluid contact may also be analyzed and used in planning the pressure gradient test. The method involves predicting an expected fluid contact 20 for each of the fluids. Although only two fluids and one contact are shown in FIG. 4, it should be appreciated that more fluids and more fluid contacts may be analyzed for the same pressure gradient test. The depth repeatability and pressure test repeatability, with an assumed confidence level, are selected along with the depth interval, number of test points for each gradient, the expected gradient values, and fluid contact depths. In FIG. 4 the expected contact point 20 is assumed to be in the middle of the interval but the method is not limited to this assumption.

An expected fluid contact error analysis may then be performed. The analysis includes determining the expected fluid contact error for the expected fluid contact 20 of each of the fluids using statistical analysis of the expected fluid contact 20, the depth repeatability, and the pressure test repeatability The statistical analysis is similar to the expected pressure gradient error analysis discussed above. From the statistical analysis, the upper and lower boundaries 18 reflecting the calculated deviation of the expected fluid contact error based on the selected confidence level are determined. The expected fluid contact 20 is also displayed. The expected pressure gradient error analysis then includes generating a simulated fluid contact 22 using the statistical analysis. The analysis further includes displaying the simulated fluid contact 22 on the confidence level boundary plot as shown in FIG. 4. Using the results from the expected pressure gradient error analysis, the expected fluid contact error analysis, as well as the graphical results of the confidence level boundary plot, the user may then set the pressure gradient test parameters for the pressure gradient test based on the acceptable level of reliability of the test results Again, one aspect of planning a pressure gradient test includes the analysis of the level of accepted reliability of the results of the planned pressure gradient test. Should the user decide the results of the expected fluid contact error analysis are not satisfactory, e.g., not reliable enough, the system 100 allows the user to perform multiple iterations altering various parameters of the simulation. For example, a different confidence level may be selected. Additionally, the expected gradient values, number of test points for each gradient, the test interval for each gradient, and the expected fluid contact depths can be changed. The expected fluid contact error analysis is then performed again using the new parameters to generate new boundary lines 18 as well as a new simulated fluid contact 22, simulated test points 12, and simulated gradients 14. The results from the analysis using the different confidence level or by varying any of the input parameters may then be used to set the actual pressure gradient test parameters or new parameters may be selected and the process repeated.

As another example, the user may alter either the expected fluid contact 20, the depth repeatability, or the pressure test repeatability, or any combination of these parameters. The expected fluid contact error analysis is then performed again Using the different parameters to generate new boundary lines 18 as well as a new simulated fluid contact 22. The results from the analysis using the different parameters may then be used to set the actual pressure gradient test parameters or new parameters may be selected and the process repeated.

As another example, the user may generate a second simulated fluid contact 22 using the statistical analysis. The new simulated fluid contact 22 is then displayed on the confidence level boundary plot along with any corresponding change in the confidence level boundary lines 18.

Figure 5:
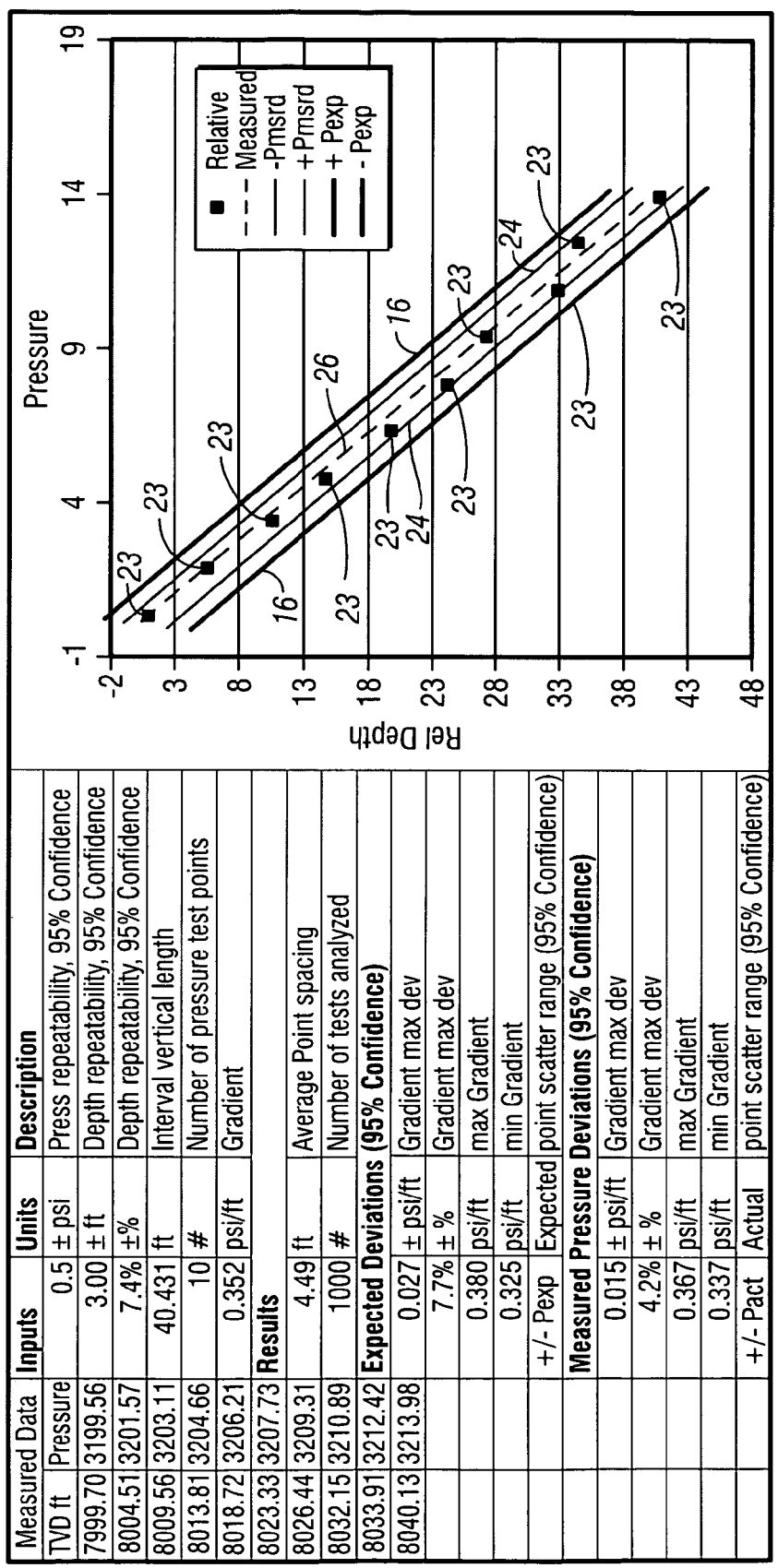
FIG. 5 illustrates diagnostic plots for gradient statistical analysis.

Once the pressure gradient test is planned, the pressure gradient test may be performed to determine a set of measured pressure data points 23 as well as a measured pressure gradient 26. The pressure gradient test may be performed soon after drilling a section of a well. However, the pressure gradient test may also be performed at other times as desired. As illustrated in FIG. 5, the system 100 may also be used to compare the expected and measured data. In FIG. 5, the measured pressure points 23 are shown in the left hand columns of the tabulated data. A statistical regression analysis is performed on these data points 23 to determine the measured gradient 26 and the upper and lower boundaries 24 based on a selected confidence limit. Once the measured pressure gradient 26 is determined, the measured pressure gradient error is then determined using statistical analysis of the measured pressure gradient involving the measured pressure and depth data points 23. The measured pressure data test points 23, the measured pressure gradient 26, and the upper and lower boundaries 24 reflecting the calculated deviation of the measured pressure gradient error are then displayed on the confidence level boundary plot along with the upper and lower, boundaries 16 reflecting the calculated deviation of the expected pressure gradient error. The expected error boundary 16 is based on a statistical analysis using the measured depth points 23 and the expected depth and pressure repeatability. A comparison may then be made between the upper and lower boundaries 24 for the measured gradient error and the upper and lower boundaries 16 for the expected pressure gradient error.

Again, one aspect of planning a pressure gradient test includes the analysis of the level of accepted reliability of the results of the planned pressure gradient test. Should the user decide the results of the measured or expected pressure gradient error analysis are not satisfactory, erg, not reliable enough, the system 100 allows the user to perform multiple iterations altering various parameters of the simulation. For example, a different confidence level may be selected. The error analysis is then performed again using the different confidence level to generate new boundary lines 16 and 24. The results from the analysis using the different confidence level may then be used to set the actual pressure gradient test parameters for a new pressure gradient test or a new confidence level may be selected and the process repeated, As another example, the user may alter either the depth repeatability, the pressure test repeatability, the location of new anticipated measured pressure points 23, or any combination of these parameters The pressure gradient error analysis is then performed again using the different parameters to generate new measured boundary lines 24 and expected boundary lines 16. The results from the analysis using the different parameters may then be used to set the actual pressure gradient test parameters or new parameters may be selected and the process repeated.

As another example, the user may generate a second set of measured pressure test data points 23 by removing or adding pressure test data points 23 from the set of measured data test points 23. The user may select which data points 23 to remove as well as which data points 23 to add. The new data points 23 are then displayed on the confidence level boundary plot along with any corresponding change in the measured confidence level boundary lines 24 and expected boundary lines 16.

The user may also wish to change any of the variables mentioned above to attempt to match the expected boundary lines 16 with the measured gradient boundary lines 24. By performing this analysis, the user can male an estimate of the actual the depth repeatability and the pressure test repeatability with an assumed confidence limit. This may allow the user to better predict borehole conditions for future planning and pressure gradient tests.

As mentioned previously, the planning of the pressure gradient test may also take into account more than one fluid in the formation. Using the expected results as illustrated in FIG. 4, the pressure gradient test is performed to determine the measured pressure data points and measured pressure gradient for each fluid. The pressure gradient test is also used to measure the fluid contact between two fluids in the formation. A comparison may then be made between the expected results as shown in FIG. 4 and the measured results. The comparison includes determining the measured fluid contact error for each contact of the more than one fluid using statistical analysis of the measured pressure and depth data. The system 100 may then be used to display the measured fluid contact and the upper and lower boundaries of the measured fluid contact error and an expected fluid contact error boundary where the expected fluid contact is based in part on the depth repeatability and the pressure test repeatability confidence limits Additionally, the confidence level boundary plots for each of the fluids can be shown for measured and expected boundary limits. Tile user, may then compare the upper and lower boundaries of the measured fluid contact error with the upper and lower boundaries of the expected fluid contact error.

Again, one aspect of planning a pressure gradient test includes the analysis of the level of accepted reliability of the results of the planned pressure gradient test. Should the user decide the results of the measured fluid contact error analysis are not satisfactory, e.g., not reliable enough, the system 100 allows the user to perform multiple iterations altering various parameters of the simulation. For example, a different confidence level may be selected The fluid contact error analysis is then performed again using the different confidence level to generate new boundary lines 18. The results from the analysis using the different confidence level may then be used to set the actual pressure gradient test parameters for a new pressure gradient test or a new confidence level may be selected and the process repeated.

As another example, the user may alter the selected data points used to determine the two fluid gradients. The system 100 may then be used to perform the fluid contact error analysis for the test points selected. New measured gradients are determined from the altered data point selections along with new measured error boundaries for the gradients and fluid contacts. Additionally, new pressure test points may then be selected to attempt to achieve an improved error boundary for the fluid contact point. The fluid contact error analysis may then be performed again and the new boundary lines 18 generated for the newly measured fluid contact. The user may then compare the expected and measured boundaries for the gradients. If the measured boundary is inside the expected boundaries then the expected level of accuracy for the fluid contact has been obtained.

As an example of using the method and system 100, FIG. 2 illustrates tabulated as well as graphical results from a statistical analysis of expected pressure gradient accuracies for a particular scenario of pressure sampling. The inputs in FIG. 2 are the parameters normally used to determine the expected results using the calculation methods described below using a Monte Carlo simulation. A Monte Carlo simulation is used to determine the expected deviations and one of the sampled Monte Carlo point sets is used for simulated actual data points and deviations. The resulting plot from the Monte Carlo simulation demonstrates how actual data can vary with the simulated pressure data points 12 and simulated pressure gradient 14 falling between the boundary lines 16 assuming a 95% confidence level. The calculations for the Monte Carlo simulation include the typical inputs of:

$P_i$—Pressure data (i . . . n)
$D_i$—Depth data (i . . . n)
n—number of data points
$\sigma_p$—Expected standard deviation for pressure (0.05 psi default, user can modify)
$\sigma_d$—Expected standard deviation for depth (0.5 ft default, user can modify)

This example Monte Carlo simulation assumes linear regression. However, it should be appreciated that other types of regression may be used, for example polynomial regression may be used in the analysis For linear regression:

$$y = mx + b$$

Where P=y and D=x

The Monte Carlo simulation varies the x and y points based on the expected standard deviation for pressure $\sigma_p$ and expected standard deviation for depth $\sigma^d$. The simulation is performed for several thousand realizations in order to obtain a statistically significant population.

The gradient slope and intercept may then be calculated for each of the simulations (also see linear regression equations below):

Slope:

$$m = \frac{S_{xy}}{S_{xx}}$$
$$= \frac{\sum(x-\bar{x})(y-\bar{y})}{\sum(x-\bar{x})^2}$$
$$= \frac{n\sum xy - (\sum x)(\sum y)}{n\sum x^2 - (\sum x)^2}$$

Intercept:

$$b = \bar{y} - m\bar{x}$$

The gradient contacts analysis includes:

Gradient linear equations:

$$y = m_1 x + b_1$$
$$y = m_2 x + b_2$$

where:

$$D_c = \frac{b_1 - b_2}{m_2 - m_1}$$

If $D_c$ falls within the recorded data show $D_c$ on the gradient plot, otherwise it is not shown.

For apparent slope standard deviation:

$$\sigma_{ma} = \sqrt{\frac{S_{yy} m S_{xy}}{n-2}} = \sqrt{\frac{S_{yy} - \frac{S_{xy}^2}{S_{xx}}}{n-2}} = \sqrt{\frac{S_{xx}\left(\frac{S_{yy}}{S_{xx}} - m^2\right)}{n-2}}$$

Also note that the apparent slope error using 2 points is zero.

For the expected slope standard deviation, perform a Monte Carlo simulation of y=mx+b using m and b from regression of the data. Then using the depth is $D_i$ for x and varying x and y with the expected standard deviations (ire., $\sigma_p$ and $\sigma_d$) determine 10,000 slopes (m) and intercepts (b) Then determine the standard deviation of these slopes.

$$\sigma_{mc} = \sqrt{\frac{n\sum m^2 - (\sum m)^2}{n(n-1)}}$$

For the apparent contact error, perform a Monte Carlo Simulation using the depths $D_i$ used for each gradient and varying the slopes ($m_1$ and $m_2$) using the apparent standard deviation from the data (i e $\sigma_{ma1}$ and $\sigma_{ma2}$) to determine 10,000 gradient contacts $D_c$. Then determine the apparent depth contact standard deviation $$\sigma_{dca} = \sqrt{\frac{n\sum D_c^2 - (\sum D_c)^2}{n(n-1)}}$$

For the expected contact error, using the Monte Carlo simulations results from the "Expected Slope Standard Deviation" for the two gradients (i.e., $\sigma_{me1}$ and $\sigma_{me2}$) where a contact has been determined, to calculate 10,000 simulated contacts From these points determine the expected contact error standard deviation.

$$\sigma_{dce} = \sqrt{\frac{n\sum D_c^2 - (\sum D_c)^2}{n(n-1)}}$$

The linear regression equations include:

For the equation y=mx+b

Useful quantities:

$$S_{xx} = \sum(x-\bar{x})^2 = \sum x^2 - \frac{(\sum x)^2}{n}$$

$$S_{yy} = \sum(y-\bar{y})^2 = \sum y^2 - \frac{(\sum y)^2}{n}$$

$$S_{xy} = \sum(x-\bar{x})(y-\bar{y}) = \sum xy - \frac{(\sum x)(\sum y)}{n} = n \cdot \text{cov}(x,y)$$

Slope:

$$m = \frac{S_{xy}}{S_{xx}}$$
$$= \frac{\sum(x-\bar{x})(y-\bar{y})}{\sum(x-\bar{x})^2}$$
$$= \frac{n\sum xy - (\sum x)(\sum y)}{n\sum x^2 - (\sum x)^2}$$

$$r^2 = \frac{S_{xy}^2}{S_{xx}S_{yy}}$$

Intercept:

$$b = \bar{y} - m\bar{x}$$

Standard deviation of the residuals:

$$S_y = \sqrt{\frac{S_{yy} - mS_{xy}}{n-2}} = \sqrt{\frac{S_{yy} - \frac{S_{xy}^2}{S_{xx}}}{n-2}} = \sqrt{\frac{S_{xx}\left(\frac{S_{yy}}{S_{xx}} - m^2\right)}{n-2}}$$

Standard deviation of the intercept:

$$S_b = S_y \sqrt{\frac{1}{n - \frac{(\sum x_i)^2}{\sum x_i^2}}}$$

Correlation Coefficient, $$r^2 = \frac{S_{xy}^2}{S_{xx}S_{yy}}$$

Standard deviation of the slope:

$$S_m = \frac{S_y}{\sqrt{S_{xx}}} = \sqrt{\frac{S_{yy} - \frac{S_{xy}^2}{S_{xx}}}{(n-2)S_{xx}}} = \sqrt{\frac{\frac{S_{yy}}{S_{xx}} - m^2}{n-2}}$$

Standard deviation of the intercept:

$$S_b = S_y\left(\frac{1}{n} + \frac{\bar{x}^2}{S_{xx}}\right)$$

Standard deviation of y prediction:

$$S_y = S_y\sqrt{1 + \frac{1}{n} + \frac{(x-\bar{x})^2}{S_{xx}}}$$

Standard deviation of an unknown x prediction read from a calibration curve:

$$S_x = \frac{S_y}{m}\sqrt{\frac{1}{L} + \frac{1}{n} + \frac{(y-\bar{y})^2}{S_{xx}m^2}}$$

Where;

n is the number of calibration data points.

L is the number of replicate measurements of the unknown and $y_c$ (bar) is the mean of the unknown measurements This description has outlined statistical analysis using Monte Carlo simulations. However, other forms of statistical analysis may also be used Additionally, there may be different approaches to the statistical calculations, While specific embodiments have been shown and described, modifications can be made by one skilled in the art without departing from the spirit or teaching of this invention The embodiments as described are exemplary only and are not limiting Many variations and modifications are possible and are within the scope of the inventions Accordingly, the scope of protection is not limited to the embodiments described, but is only limited by the claims that follow, the scope of which shall include all equivalents of the subject matter of the claims.

What is claimed is:

1. A method of planning a downhole pressure gradient test comprising:
    predicting an expected pressure gradient for at least one fluid in a formation;
    selecting a confidence level for at least one of a depth and a pressure measurement for each fluid;
    selecting the depth positions where pressure test data are to be obtained;
    performing an expected pressure gradient error analysis for each fluid; and
    plotting a confidence level boundary plot displaying outer boundaries of the expected pressure gradient error for each fluid.

2. The method of claim 1 further comprising plotting at least one of the expected pressure gradient and the simulated pressure gradient for each fluid.

3. The method of claim 1 wherein performing an expected pressure gradient error analysis for each fluid comprises determining the error for the expected pressure gradient using statistical analysis of the expected pressure gradient and the confidence level for at least one of the depth and pressure measurement.

4. The method of claim 1 wherein performing an expected pressure gradient error analysis further comprises:
  determining a simulated pressure gradient for each fluid based on simulated pressure test data at the selected depth positions; and
  plotting a set of simulated pressure test data and the simulated pressure gradient for each fluid on the confidence level boundary plot.

5. The method of claim 1 further comprising:
  altering at least one of the expected pressure gradient, confidence level, depth positions, and number of depth positions for at least one fluid; and
  performing the expected pressure gradient error analysis for each of the at least one fluid with any of the altered expected pressure gradient, confidence level, depth positions, or number of depth positions.

6. The method of claim 1 wherein the depth positions are unequally spaced.

7. The method of claim 1 further comprising:
  predicting an expected pressure gradient for more than one fluid in a formation;
  predicting an expected fluid contact for the contact of each fluid;
  selecting a confidence level for at least one of a depth and a pressure measurement for each fluid contact;
  performing an expected fluid contact error analysis for each fluid contact; and
  plotting each expected fluid contact and corresponding outer boundaries of the expected fluid contact error on the confidence level boundary plot.

8. The method of claim 7 wherein performing an expected fluid contact error analysis for each expected fluid contact comprises determining the expected fluid contact error for a corresponding fluid contact using statistical analysis of the expected fluid contact and the selected confidence level for at least one of the depth and pressure measurement for the fluid contact.

9. The method of claim 7 wherein performing an expected fluid contact error analysis further comprises:
  generating a simulated fluid contact using the statistical analysis; and
  displaying at least one of the expected fluid contact and simulated fluid contact on the confidence level boundary plot.

10. The method of claim 7 further comprising:
  altering at least one of the expected fluid contact and the confidence level for at least one of a depth and a pressure measurement for the fluid contact; and
  performing the expected fluid contact error analysis for any of the altered expected fluid contact or confidence level.

11. A method of evaluating a pressure gradient test comprising:
  performing a pressure gradient test to measure a set of pressure data for a set of depth positions;
  determining the measured pressure gradient for at least one fluid in a formation;
  selecting a confidence level for at least one of a depth and a pressure measurement for each fluid;
  performing a measured pressure gradient error analysis for each fluid;
  plotting a confidence level boundary plot displaying the set of measured pressure data, the measured pressure gradient, and the outer boundaries of the measured pressure gradient error for each fluid.

12. The method of claim 11 further comprising:
  performing an expected pressure gradient error analysis for each fluid to determine the expected pressure gradient error using statistical analysis of the measured set of pressure data, the measured pressure gradient, selected confidence level for at least one of a depth and a pressure measurement for each fluid, and a selected expected repeatability for at least one of depth and pressure; and
  plotting outer boundaries of the expected pressure gradient error on the confidence level boundary plot for each fluid.

13. The method of claim 12 further comprising:
  altering at least one of a pressure data and depth position to create a modified set of pressure data for the set of depth positions for at least one fluid;
  determining the modified measured pressure gradient using the modified set of pressure data;
  performing a modified measured pressure gradient error analysis using the modified measured pressure gradient; and
  plotting the modified set of measured pressure data, the modified measured pressure gradient, and the outer boundaries of the modified measured pressure gradient error on the confidence level boundary plot.

14. The method of claim 11 further comprising:
  determining the measured pressure gradient for more than one fluid;
  measuring at least one fluid contact for the contact of each fluid;
  selecting a confidence level for at least one of a depth and a pressure measurement for each fluid contact;
  performing a measured fluid contact error analysis for each fluid contact; and
  plotting each measured fluid contact and corresponding outer boundaries of the measured fluid contact error on the confidence level boundary plot.

15. The method of claim 14 wherein performing a measured fluid contact error analysis for each fluid contact comprises determining the measured fluid contact error for a corresponding fluid contact using statistical analysis of the measured fluid contact and the selected confidence level for at least one of the depth and pressure measurement for the fluid contact.

16. A computer system comprising:
  a processor; and
  a non-volatile memory coupled to the processor and storing a program;
  wherein the processor executes the program stored on the non-volatile memory to:
    determine the measured pressure gradient for at least one fluid in a formation from a set of measured pressure data for a set of depth positions;
    perform a measured pressure gradient error analysis for each fluid using a selected confidence level for at least one of a depth and a pressure measurement for each fluid; and
    plot a confidence level boundary plot displaying the set of measured pressure data, the measured pressure gradient, and the outer boundaries of the measured pressure gradient error for each fluid.

17. The computer system of claim 16 further comprising wherein the processor executes the program stored on the non-volatile memory to:
  perform an expected pressure gradient error analysis for each fluid to determine the expected pressure gradient error using statistical analysis of the measured set of pressure data, the measured pressure gradient, the selected confidence level for at least one of a depth and a pressure measurement for each fluid, and the selected repeatability for at least one of a depth and pressure; and
  plot outer boundaries of the expected pressure gradient error on the confidence level boundary plot for each fluid.

18. The computer system of claim 17 further comprising wherein the processor executes the program stored on the non-volatile memory to:
  determine a modified measured pressure gradient for at least one fluid using a modified set of pressure data for at least one fluid;
  perform a modified measured pressure gradient error analysis using the modified measured pressure gradient; and
  plot the modified set of measured pressure data, the modified measured pressure gradient, and the outer boundaries of the modified measured pressure gradient error on the confidence level boundary plot.

19. The computer system of claim 16 further comprising wherein the processor executes the program stored on the non-volatile memory to:
  determine the measured pressure gradient for more than one fluid;
  perform a measured fluid contact error analysis for each measured fluid contact for the contact of each fluid using a selected confidence level for at least one of a depth and a pressure measurement for each fluid contact; and
  plot each measured fluid contact and corresponding outer boundaries of the measured fluid contact error on the confidence level boundary plot.

20. The computer system of claim 16 further comprising wherein the processor executes the program stored on the non-volatile memory to determine the measured fluid contact error for a corresponding fluid contact using statistical analysis of the measured fluid contact and the selected confidence level for at least one of the depth and pressure measurement for the fluid contact.

21. A computer readable media storing instructions executable by a computer system, and, when executed, the instructions implement a method comprising:
  determining the measured pressure gradient for at least one fluid in a formation from a set of measured pressure data for a set of depth positions;
  performing a measured pressure gradient error analysis for each fluid using a selected confidence level for at least one of a depth and a pressure measurement for each fluid; and
  plotting a confidence level boundary plot displaying the set of measured pressure data, the measured pressure gradient, and the outer boundaries of the measured pressure gradient error for each fluid.

22. The computer readable media of claim 21, the method further comprising:
  performing an expected pressure gradient error analysis for each fluid to determine the expected pressure gradient error using statistical analysis of the measured set of pressure data, the measured pressure gradient, the selected confidence level for at least one of a depth and a pressure measurement for each fluid, and the selected repeatability for at least one of a depth and pressure; and
  plotting outer boundaries of the expected pressure gradient error on the confidence level boundary plot for each fluid.

23. The computer readable media of claim 22, the method further comprising:
  determining a modified measured pressure gradient for at least one fluid using a modified set of pressure data for at least one fluid;
  performing a modified measured pressure gradient error analysis using the modified measured pressure gradient; and
  plotting the modified set of measured pressure data, the modified measured pressure gradient, and the outer boundaries of the modified measured pressure gradient error on the confidence level boundary plot.

24. The computer readable media of claim 21, the method further comprising:
  determining the measured pressure gradient for more than one fluid;
  performing a measured fluid contact error analysis for each measured fluid contact for the contact of each fluid using a selected confidence level for at least one of a depth and a pressure measurement for each fluid contact; and
  plotting each measured fluid contact and corresponding outer boundaries of the measured fluid contact error on the confidence level boundary plot.

25. The computer readable media of claim 21, the method further comprising determining the measured fluid contact error for a corresponding fluid contact using statistical analysis of the measured fluid contact and the selected confidence level for at least one of the depth and pressure measurement for the fluid contact.

* * * * *